United States Patent Office 3,420,878
Patented Jan. 7, 1969

3,420,878
MALEIC ACID PROMOTED OXIDATION PROCESS
William D. Vanderwerff, West Chester, Pa., assignor to Sun Oil Company, Philadelphia, Pa., a corporation of New Jersey
No Drawing. Filed Apr. 27, 1966, Ser. No. 545,547
U.S. Cl. 260—524        9 Claims
Int. Cl. C07c 51/20; C07c 63/36

This invention relates to improvements in the preparation of aromatic carboxylic acids produced by the catalytic liquid phase oxidation of aromatic compounds and more particularly pertains to a process for the catalytic liquid phase oxidation of aromatic compounds in the presence of an enhanced catalyst system whereby the reaction rate is greatly improved.

Various methods are known for preparing aromatic carboxylic acids. In more recent times, one such process has received considerable attention and has been shown to possess many advantages over the other prior art methods. This process involves a catalytic liquid phase oxidation process by which an alkyl substituted aromatic compound is oxidized with molecular oxygen in the conjoint presence of a catalyst system containing a heavy metal oxidation catalyst, a source of bromine and in the presence of a monocarboxylic acid solvent as reaction medium. By such a process aliphatic substituents of a benzenoid ring of an aromatic, fused aromatic, or polyphenyl compound, independent of the size or conformation of the aliphatic substituent, are selectively oxidized to a COOH group attached directly to a benzenoid ring.

It is an object of this invention to provide a process which is satisfactory for the preparation of aromatic carboxylic acids in good yields. It is a further object to provide such products of good quality and at economical and commercially advantageous rates. It is a further object to enhance the efficiency and efficacy of an already advantageous process so that commercial plants empolying same may remain competitive for a longer period of the life of the equipment. It is a primary and special object of this invention to provide an advantageous process for the preparation of 2-naphthoic acid from 2-methylnaphthalene. Other objects will become apparent from this disclosure considered as a whole.

The objects of this invention are, in general, attained by charging maleic acid as an oxidation promoter to the catalytic liquid phase oxidation of alkyl aromatic compounds comprising oxidizing same with molecular oxygen in the presence of a catalyst system containing a heavy metal oxidation catalyst, a source of bromine and in the presence of a carboxylic acid solvent.

In general, the reaction conditions that are suitable are the same as those reported in Saffer et al. Patents 2,833,816; 3,089,906 and 3,089,907. These are discussed some herein for convenience, although reference is made to those patents for any more extensive teachings in regard to the basic reaction. Generally the conditions and materials comprise the following:

As to the alkyl aromatic compounds which can be oxidized according to this invention, these may be either mono- or polyalkyl aromatics of single or polynuclear configuration. Examples are toluene, ethylbenzene, hexylbenzene xylenes, 1-methyl-4-butylbenzene, 2-methylnaphthalene, 2,6-dimethylnaphthalene, nonylnaphthalene and the like. Preferred oxidizing stocks are monoalkyl benzenes and naphthalenes. A specially preferred feed is 2-methylnaphthalene from which 2-naphthoic acid is prepared.

The amount of maleic acid promoter that can be employed varies within relatively wide limits. Usually from 0.01 to 0.10 part by weight based on the alkylaromatic component will be employed. Preferably, from about 0.03 to about 0.06 part of the maleic acid on the same basis are employed.

Metal oxidation catalysts suitable for the catalyst system of this process include those heavy metals capable of existence in variable valence states and are the most desirable as the source of heavy metal oxidation catalyst. Preferred as the source of heavy metal oxidation catalyst in the above catalyst system are manganese, cobalt, nickel, chromium, vanadium, molybdenum, tungsten, tin, gadolinium, and cerium. The metals per se can be employed or they may be employed in combined forms providing metal ions such as the metal oxide and carboxylates, for example, a cobalt acetate, manganese acetate, ammonium molybdate, cobalt hydroxy quinolate and manganese versene. The metal oxidation catalyst can be a single source of metal oxidation catalyst or a combination of metal oxidation catalysts. Cobalt is the preferred heavy metal to be employed especially in the form of cobalt acetate. As a source of bromine for the catalyst system there can be employed bromine in elemental, combined or ionic form. Other than bromine itself, hydrogen bromide, ammonium bromide, potassium bromate, tetrabromoethane, benzyl bromide among other compounds soluble in the reaction medium can be employed. The bromides of metals are the preferred form. The amount of the catalyst calculated as $MnBr_2$ may be in the range of about 0.1 to 10 percent by weight or more of the aromatic reactant charged, desirably 0.3 to 2, and preferably 0.5 to 1.7 percent. Mixtures of materials may be used; and the proportions of manganese and bromine may be varied from their stoichiometric proportions encountered in $MnBr_2$, e.g., in the range of about 1 to 7 atoms of manganese per atom of bromine, and about 1 to 10 atoms of bromine per atom of manganese. Equivalent and similar variations and proportions can be employed in the case of other heavy metal catalysts.

A wide variety of carboxylic acid solvents may be employed in the reaction. The carboxylic acids make excellent solvents for both the reactant and catalyst. Since carboxylic acids form part of the catalyst and there is no upper limit to the amount of carboxylic acid the reaction will tolerate, these solvents can be used as the source of the carboxylic portion of the catalyst as well as the solvent. For obvious reasons, it is highly desirable to use a liquid carboxylic acid although solid carboxylic acids can be used in conjunction with other solvents or under liquefying conditions. Thus, benzoic acid dissolved in benzene has been used as a combined solvent and source of carboxylic acid for the catalyst system. Soluble, liquid, or liquefiable products of the oxidation can be used as solvents in the reaction so that separation steps are minimized. Examples of carboxylic acids comprise aliphatic carboxylic acids, for example, acetic, propionic, butyric, etc. acids, cycloaliphatic carboxylic acids, for example, naphthenic acid, cyclohexanecarboxylic acid, etc. In addition, carboxylic precursors, such as carboxylic anhydrides, for example, acetic anhydride, etc., can also be employed. These anhydrides can serve as solvents, as a means for removing water and can furnish the carboxylic acids necessary for the catalyst. Mixtures of these acids with other solvents can also be employed, for example, mixtures of acetic acid with acetophenone, etc. As a class, the lower aliphatic carboxylic acids of 2–8 carbons are preferred as solvents. The specific carboxylic acids preferred are acetic and propionic acids.

The process can be carried out at subatmospheric pressure, atmospheric pressure or superatmospheric pressures. However, there is no particular advantage to carrying out the process at any pressure other than atmospheric except in a few possible instances. This is true since the carrying out of the reaction at subatmospheric pressures requires the use of relatively complicated control equipment. In carrying out the reaction at elevated pressures the use of relatively expensive high temperature process equipment is required. Since the reaction proceeds at a reasonable rate at atmospheric pressure, it is not deemed advantageous to carry out the reaction at elevated pressures although there are no particular disadvantages to the use of elevated pressures other than the equipment cost problem. In some cases, an autogeneous pressure develops during the reaction and operating with such pressure may be found advantageous at times.

The temperature of the reaction of the present invention may also vary within fairly wide limits. The reaction can occur with temperatures as low as room temperature (i.e., about 25° C.). However, I have found that at temperatures below about 70° C. the reaction proceeds at a relatively slower rate. Satisfactory results are obtained when running the reaction at temperatures from about 80° C. up to a temperature of about 250° C. However, I prefer to carry out the reaction at the reflux temperature of the reaction mixture. Where the reaction mixture contains a large amount of acetic acid as a solvent, and since this acid is generally the lowest boiling major constituent of the reaction mixture, it is found that the reflux temperature is near the boiling point at atmospheric pressure of the acid, i.e., about 110–115° C.

In the oxidation of the alkyl side-chains to carbonyl or carboxyl groups one of the products of reaction is water. In carrying out the reaction, it is found that the presence of a large amount of water has an adverse effect on the rate of reaction. Thus, when an amount of water in excess of about 0.05 part by weight per part of solvent (5 percent by weight) is allowed to accumulate, the reaction is substantially stopped. Therefore, I prefer to carry out the reaction under nearly anhydrous conditions and with a maximum of about 0.05 part water per part solvent. Minute traces of water are often desirable since these help solubilize $Co(OAc)_2$. Thus, $Co(OAc)_2 \cdot 4H_2O$ is very soluble in acetic acid while anhydrous $Co(OAc)_2$ is only slightly soluble. However, anhydrous $Co(OAc)_2$ is quite soluble in acetic acid when hydrogen bromide is present. The removal of water during the reaction is readily accomplished by allowing the water to distill from the reaction mixture as it is formed. The effect of water can also be minimized by keeping the ratio of the aralkyl compound to solvent low. Azeotropic agents such as benzene, heptane, etc. or carboxylic acid anhydrides can also be used in removing water from the reaction mixture. In addition to adversely effecting the reaction, large amounts of water tend to impart a yellow color to the reaction products. Keeping the reaction under nearly anhydrous conditions aids in the preparation of colorless products.

The total amount of molecular oxygen added to the reaction system is, of course, dependent upon the aromatic compound being oxidized. The minimum amount of molecular oxygen added to the reaction mixture is the stoichiometric amount required to react with the aliphatic group or groups being oxidized to a COOH group or groups. For example, the stoichiometric amount of oxygen required for each methyl group oxidized is 1.5 moles of oxygen, for each ethyl group oxidized is 3.0 moles, etc. Since the liquid phase oxidation reaction is in part dependent upon the efficiency of contact between the gas and liquid as well as the rate of absorption and/or reaction of the oxygen in the liquid medium, complete utilization of the oxygen introduced is not attained throughout the entire reaction. However, under the conditions of temperature, pressure, the use of the reaction medium and the use of the catalyst system according to the process of this invention, there is a period of extremely high efficiency of adsorption and utilization of the oxygen. The extent of this portion of the reaction during which there is a high rate of utilization of oxygen is dependent somewhat upon the aromatic compound being oxidized but also upon the presence of my maleic acid promoter. When the rate of utilization is high, little or no unconsumed oxygen is present in the exit gas. For example, when a xylene is being oxidized with air there is little or no oxygen, 0 to 2% by volume, in the off gas for as long as about 30 to 40 minutes of a 50 to 60 minute total reaction cycle, which includes a slow addition of source of oxygen at the initial portion of the reactoin when oxidation is being initiated and during the finish-off period.

The maximum rate at which the source of molecular oxygen can be added to the reaction mixture is not only governed by the rate of utilization and absorption of oxygen, but is also dependent upon such other correlated factors as the hydrostatic head in the reactor and the vapor space in the reactor. As to the latter factors affecting the oxygen flows that are related to the equipment and closely associated features of same, the equipment and the discusion of this feature in connection therewith is adequately set forth in Saffer Patents 3,089,906 and 3,089,907, and, accordingly, need not be repeated here. It is to be understood, however, that barring such physical limitations on oxygen flows my maleic acid promoter substantially increases the reaction rate, thereby, increases the rate of oxygen consumption, and eventually the flows and throughput of the equipment over that when such is not employed.

In order to disclose the nature of the present invention still more clearly, the following illustrative example will be given. It is to be understood that the invention is not to be limited to the specific conditions or details set forth in the example except insofar as such limitations are specified in the appended claims.

ILLUSTRATIVE EMBODIMENT 2-methylnaphthalene was oxidized to 2-naphthoic acid by dissolving 0.333 mole of the 2-methylnaphthalene in 1000 ml. of acetic acid as solvent, 0.050 mole of cobaltous acetate tetrahydrate, 0.0167 mole of lithium bromide, and 0.043 mole of maleic acid were then added, oxygen was bubbled through at a temperature of about 100° C.

The average rate of oxidation expressed as moles of naphthoic acid formed per liter per hour was 0.130. This is contrasted with a rate of only 0.113 when the reaction was carried out under the same conditions except for the absence of the maleic acid.

The relative amounts of said cobaltous acetate, lithium bromide, and maleic acid are in the range of 1.0, 0.03 and 0.10 to 1.0, 1.0 and 1.0 respectively.

I claim:

1. In a process for oxidizing an alkyl aromatic compound to form an aromatic carboxylic acid wherein an elemental oxygen containing gas is bubbled through said alkyl aromatic compound dissolved in a carboxylic acid solvent, in the presence of a catalyst system comprising a combination of a cobalt salt and an alkali metal salt of bromine in said solvent and wherein the temperature of said reaction is about 70° to about 250° C., the improvement comprising adding to said reaction mixture a small amount of maleic acid as promoter for said oxidation wherein the amount of maleic acid employed is in the range of 0.01 to 0.10 parts by weight based on said alkyl aromatic.

2. A process according to claim 1 wherein said alkyl aromatic is an alkyl naphthalene.

3. A process according to claim 1 wherein said alkyl aromatic is an alkyl benzene.

4. A process according to claim 2 wherein said alkyl naphthalene is 2-methylnaphthalene and wherein said aromatic carboxylic acid formed is 2-naphthoic acid.

5. The process according to claim 1 wherein said cobalt is present as a salt of a monocarboxylic acid.

6. The process according to claim 2 wherein said monocarboxylic acid solvent is acetic acid, said cobalt salt is cobaltous acetate and said alkali metal salt of bromine is lithium bromide.

7. The process according to claim 6 wherein the relative molar amounts of said cobaltous acetate, lithium bromide, and maleic acid are in the range of 1.0, 0.03 and 0.10 to 1.0, 1.0 and 1.0 respectively.

8. The process according to claim 7 wherein the alkyl aromatic is 2-methylnaphthalene and the temperature of said reaction is about 100° C.

9. The process according to claim 1 wherein the amount of maleic acid employed is in the range of 0.03 to 0.06 parts by weight based on said alkyl aromatic.

References Cited

UNITED STATES PATENTS

| | | | |
|---|---|---|---|
| 2,833,816 | 5/1958 | Saffer et al. | 260—524 |
| 3,089,906 | 5/1963 | Saffer et al. | 260—524 |
| 3,089,907 | 5/1963 | Saffer et al. | 260—524 |

BERNARD HELFIN, *Primary Examiner.*